Sept. 8, 1936.　　　T. L. ROBINSON　　　2,053,534
ROLLER BEARING
Filed March 20, 1935

Witness:
Martin H. Olsen

Inventor:
Thomas L. Robinson
By Geo. E. Ebald, Atty

Patented Sept. 8, 1936

2,053,534

UNITED STATES PATENT OFFICE 2,053,534

ROLLER BEARING

Thomas L. Robinson, Valparaiso, Ind., assignor to McGill Manufacturing Company, Valparaiso, Ind., a corporation of Indiana Application March 20, 1935, Serial No. 11,977

1 Claim. (Cl. 308—179)

This invention relates to roller bearings and relates particularly to retainers for such bearings.

Objects of the invention are:

To provide a retainer for spacing and confining the anti-friction rollers of roller bearings in operative relation to the bearing surfaces to which they are applied in use and to each other, which will be simple in construction, strong, durable and effective for its designed purpose;

To provide a roller bearing comprising a retainer of new and novel construction, provided with pockets or openings in which the rollers are confined so as to turn freely, without retardation by frictional contact with the walls of the pockets in which they are confined.

In accordance with the invention, a bearing and the retainer thereof, embodying my invention and improvements, comprise the various features, combinations of features and details of construction, hereinafter described and claimed.

Roller bearings of the type to which the invention relates are used extensively on the crank pin bearings of internal combustion engines, in which applications, for the most part, it is necessary to use split bearings.

In the accompanying drawing, in which the invention is shown as applied in use to a split roller bearing, Figure 1 is a sectional side view on the line 1—1 of Fig. 2 the anti-friction rollers being shown in side view;

Figure 1:
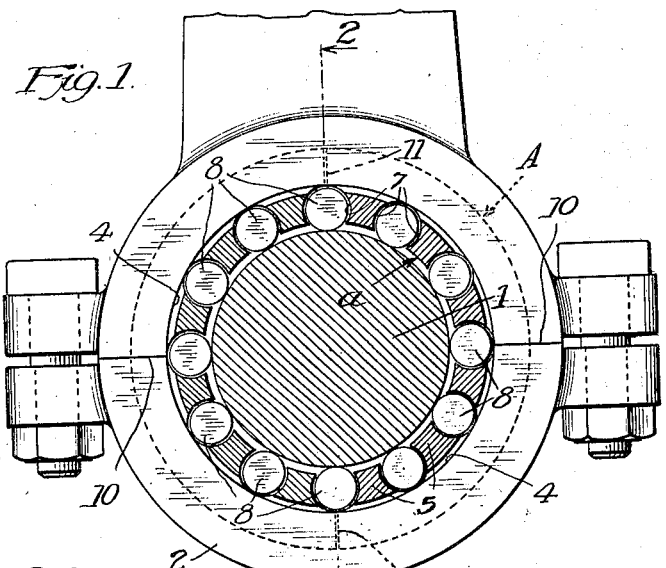
Figure 2:
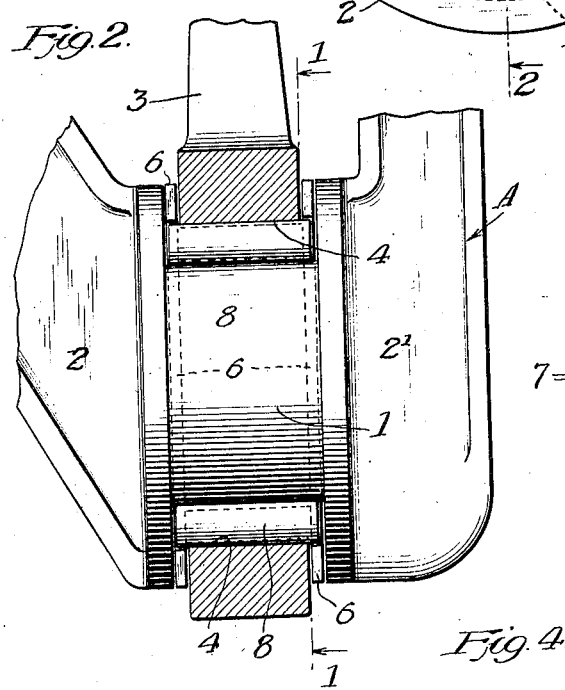
Figure 2 is a sectional view on the line 2—2 of Fig. 1, with parts shown in elevation.

Describing the invention with reference to the drawing, in which, for purposes of clear and definite illustration, I have shown an anti-friction bearing—for purposes of convenient reference designated as a whole A—as applied in use to a crank pin 1 for driving the crank shaft, not shown, of an automobile or other internal combustion engine. Excepting as regards the construction of the bearing and the retainer thereof, designated as a whole a, the crank pin bearing shown in the drawing is of a usual type and will readily be understood by persons and mechanics familiar with such devices from an examination of the drawing, without any extended description thereof in detail. Briefly, 2, 2' are the crank arms, in which respectively, opposite ends of the crank pin are secured, and 3 is the connecting rod of the engine which is provided with a bearing 4, for the crank pin, being operatively connected to the crank pin 1 by the roller bearing A.

Figure 4:
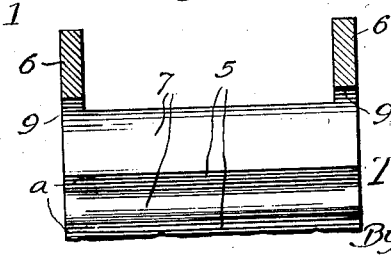
Figure 4 is an enlarged, fragmentary view on the line 4—4 of Fig. 3.

In accordance with the invention, a bearing A embodying my invention and improvements consists of bars 5, which are rigidly connected together in parallel, spaced relation both to each other and to the axis of the retainer, by marginal flanges 6, said bars and flanges, preferably being formed integral with each other, as shown, see Fig. 4. The spaces or pockets 7 between adjacent bars 5 are proportioned to receive the anti-friction rollers 8, with contemplated operating clearance, the relation preferably being such that the retainer a will "pilot" on said rollers but with sufficient clearance to permit them to turn freely without frictional retardation by contact with the rollers 8. The length of the rollers 8 is substantially equal to that of the retainer a, being only sufficiently shorter than said retainer, to provide operating clearance between the ends of said rollers and abutting surfaces between which the retainer may be mounted. Also, the dimension of the bars 5 radially of the retainer a, is less than the diameter of the anti-friction rollers, and the spaces or pockets 7 are so arranged that the rollers 8, when in engagement with said spaces or pockets will project, radially, at both sides of the bars 5, in position to contact both with the crank pin 1 and the connecting rod bearing 4—which may exemplify any bearings to which the retainer is applied.

Figure 3:
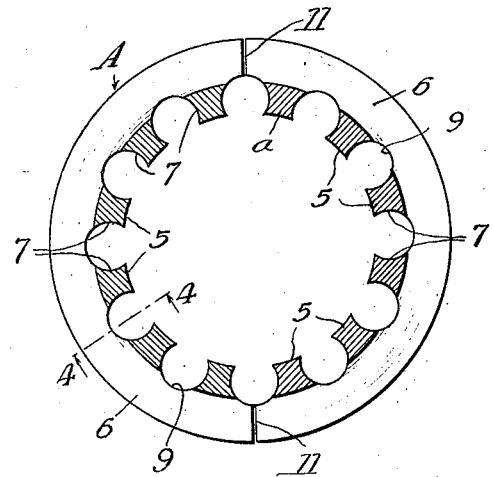
Figure 3 is a detached view of the retainer substantially similar to that shown in Fig. 1, with the anti-friction rollers removed.

In the preferable construction shown, also, see particularly Figs. 1 and 3, the adjacent sides of adjacent bars 5 are arcuate, forming segments of circles described from a point in the axis of a roller 8 confined therein.

Also, as shown, the roller pockets 7 comprise short arcs 9 formed in the inner edges of the marginal flanges 6, which would confine the rollers 8 in the retainer a, even though the spaces between the outer edges of adjacent bars 5 were sufficiently wide to permit the rollers 8 to pass through the same.

Where, as shown, opposite ends of the crank pin 1 are permanently secured in the crank-arms 2, 2', it is obvious that both the crank pin bearing 4 in the connecting rod 3 and the anti-friction bearing A will have to be assembled laterally or radially on the crank pin 1, and to provide for doing this, both said connecting rod bearing 4 and the anti-friction bearing A are split bearings—the crank pin bearing 4 being split at 10, as best shown in Fig. 1, and the anti-friction bearing A being split at 11, see Figs. 1 and 3, all as will readily be understood. Preferably, but not necessarily, the line of severance of the retainer $a$ will be through the centers or axes of diametrically opposite roller spaces or pockets 7, as shown in Figs. 1 and 3, so that the rollers 8 will maintain the separate segments of the retainer substantially in contemplated operating relation in the bearing A.

While, for the reasons stated, the retainer $a$ for the bearing A, is shown as a split bearing, my invention contemplates equally, making said retainer in a single integral part, where conditions permit said retainer to be inserted axially into engagement with a crank pin or other member.

Also, while I prefer to use roller pockets having cylindrical walls, other forms of pockets may be used, if desired, as the arcs or portions 9 of the pockets 7, formed in the inner edges of the flanges 16, will operate at all times to prevent radial displacement of said rollers from said pockets, both inwards and outwards.

An important advantage inherent in my improved bearing is that, due to the fact that the length of the rollers 8 are the same as the overall axial dimension of the retainer $a$, less operating clearance, all end thrust of the anti-friction rollers, in operation, produced by misalignment of the bearing due to deflection thereof, or other cause, will be absorbed by the flange plates at the ends of the crank pin, thereby relieving said retainer from all stresses resulting from this cause, which would tend to produce distortion of the retainer, with resultant binding of the rollers and possible injury to the bearing.

I claim:

The improvements herein described and comprising a crank-pin, integral, radial flanges at the ends of the crank pin, a co-operating connecting rod bearing having radially extending ends opposed to the crank-pin flanges, a roller bearing interposed between the crank pin and the connecting rod bearing, the rollers of the roller bearing having flat ends opposed to said flanges and fitting loosely therebetween, a cage for said rollers comprising spacer bars for the rollers, and thin circumferential flanges secured to the bars at their ends and extending radially outward between the crank-pin flanges and the ends of the connecting rod bearing.

THOMAS L. ROBINSON.